United States Patent [19]

Barger

[11] 4,149,060
[45] Apr. 10, 1979

[54] ANGLED STRIP CLADDING SYSTEM

[75] Inventor: John J. Barger, Ringgold, Ga.

[73] Assignee: Combustion Engineering, Inc., Windsor, Conn.

[21] Appl. No.: 818,362

[22] Filed: Jul. 25, 1977

[51] Int. Cl.² .................................................. B23K 9/18
[52] U.S. Cl. .................................. 219/73; 219/76.14; 219/123; 219/126
[58] Field of Search .................. 219/73 R, 76.14, 123, 219/126

[56] References Cited

U.S. PATENT DOCUMENTS

| | | | |
|---|---|---|---|
| 2,152,194 | 3/1939 | Jones | 219/123 X |
| 2,912,562 | 11/1959 | Donovan | 219/76.14 X |
| 3,156,968 | 11/1964 | White | 219/76.14 X |
| 3,205,336 | 9/1965 | Smith | 219/76.14 |
| 3,596,041 | 7/1971 | Frus | 219/73 R |
| 3,832,523 | 8/1974 | Kitani | 219/76 |
| 3,882,298 | 5/1975 | Neff | 219/123 X |
| 3,885,123 | 5/1975 | Sciaky | 219/123 |
| 3,936,655 | 2/1976 | Arnoldy | 219/73 R |

Primary Examiner—Richard R. Kucia
Attorney, Agent, or Firm—Joseph H. Born; Richard H. Berneike

[57] ABSTRACT

A method and apparatus for strip cladding into a corner while magnetically agitating the weld deposit. The clad strip is angled away from the corner in the plane of the electrode strip, and means are provided for using the corner-forming obstruction as a pole piece for the electromagnet. The welding head can thereby be positioned to clad into the corner without interference from an obstructing pole piece or from the welding head itself.

4 Claims, 5 Drawing Figures

ANGLED STRIP CLADDING SYSTEM

BACKGROUND OF THE INVENTION

The present invention relates to strip cladding, and in particular to the type of strip cladding in which electromagnetic pole pieces are provided for the purpose of causing a magnetic field in the region of the electrode strip.

In Barger, U.S. patent application Ser. No. 596,878, now issued as U.S. Pat. No. 4,027,135, an apparatus was disclosed in which a favorable tie-in between adjacent cladding strips or weld beads was accomplished by the provision of a pulsating magnetic field on the trailing side of the strip electrode. The Barger application is hereby incorporated by reference. The pulsating magnetic field in the Barger application was caused by two magnetic pole pieces, one on either side of the deposited strip, each being slightly to the trailing side of the electrode strip. The electromagnets were pulsed in such a manner as to cause a pulsating magnetic field that opposed the magnetic field created on the trailing side of the strip electrode by the welding current. The changing magnetic field caused forces on the molten welding flux covering the molten clad strip, so as to agitate both the molten welding flux and the molten strip. This agitation of the molten strip prevented the formation of a channel between adjacent strips so that it was not necessary to manually fill inter-strip channels.

Strip cladding is often carried out on the interior of vessels; a carbon-steel vessel, for instance, might be coated with a stainless-steel cladding. The welding head is positioned at a point on the interior of the vessel, the vessel is then rotated, and a circular or spiral strip is deposited on the interior of the vessel by appropriate axial motion of the head. In the past, when the welding head came close to a flange on the vessel, the operation had to be stopped, and the remainder of the clad was applied manually. As can be appreciated, this manual cladding operation is quite time consuming and expensive. It was nonetheless necessary, because the flange constituted an obstruction that prohibited the cladding from being deposited right up to the edge of the flange.

Another limitation on the use of strip cladding has been the difficulty of depositing cladding strips in relatively small-diameter cylinders. It is sometimes necessary to clad the interiors of fluid conduits that are not large enough to accommodate both the welding head and the strip-electrode spool. In such instances, the welding head is inserted into the cylinder, and the electrode strip is fed from a spool located outside the conduit. In order to lead the electrode strip from the plane of the spool to the plane of the welding head, the electrode strip must be spiraled, and the room taken up by the spiral sets a lower limit on the size of the cylinder that may be clad circumferentially.

SUMMARY OF THE INVENTION

The present invention reduces these limitations on the use of strip cladding. It is an improvement in an apparatus for the submerged-arc cladding of a metallic work piece with a metal electrode strip that melts in an electric arc while forming a weld bead on the work piece. In this type of cladding apparatus, there exist means for moving an electrode strip and a work piece relative to each other and for passing an electric current through the electrode, creating an electric arc between the work piece and the electrode. The electrode strip melts, and a cladding layer is thereby deposited on the work piece in a generally linear cladding zone. Such an apparatus also includes means for depositing a welding flux that covers the region of the electric arc and leaves a portion of the weld bead still in its molten state. The flux covering provides a layer of molten flux to cover the molten metal. In addition, the cladding apparatus on which the present invention is an improvement includes magnetic poles of opposite polarity positioned adjacent opposite edges of the electrode strip for the purpose of agitating the molten metal by agitating the molten flux in contact with it.

The improvement is intended for use on a work piece having an obstruction generally transverse to the surface to be clad. According to the present invention, means are provided for causing a magnetic flux to travel through the obstruction, thereby permitting the obstruction itself to act as a magnetic pole and eliminating the necessity for a separate magnetic pole piece so located as to prevent cladding all the way up to the edge of the obstruction. Further, the electrode strip is inclined away from the obstruction in the plane of the strip, thereby further facilitating strip cladding in the corner formed in the work piece by the obstruction.

Since the strip electrode is fed at an angle in the plane of the electrode strip according to the present invention, the space taken up by the spiral required to rotate the plane of the strip from the plane of the spool to the plane of the welding head is reduced, thereby reducing the lower limit on the size of the cylinder that can be strip clad.

BRIEF DESCRIPTION OF THE DRAWINGS

These and further features and advantages of the present invention are illustrated in connection with the attached drawings, in which.

DETAILED DESCRIPTION OF THE PREFERRED EMBODIMENT

Figure 1:
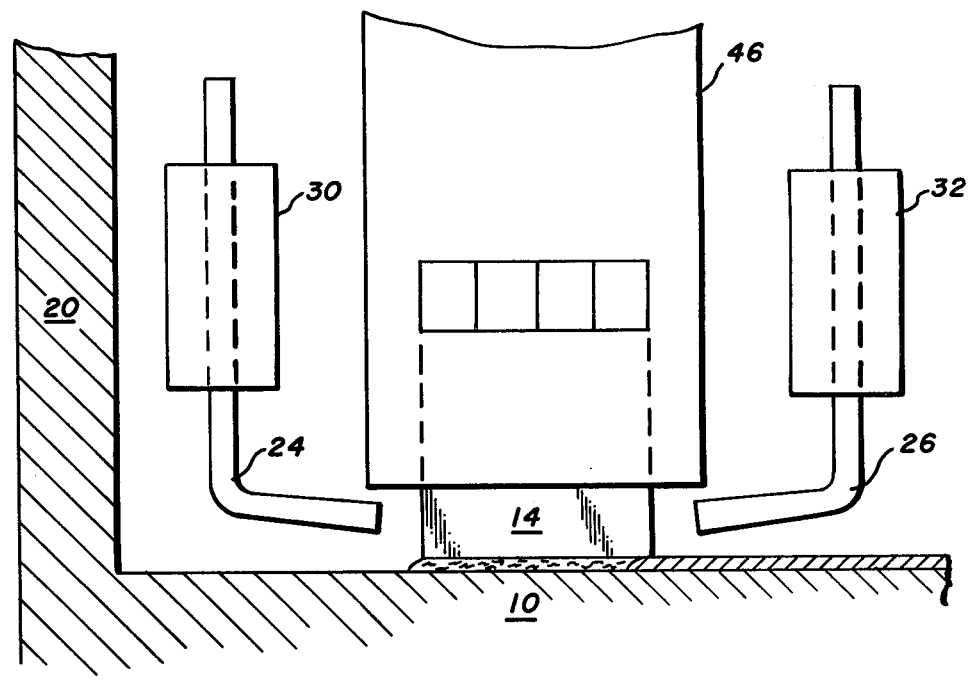
FIG. 1 is a front elevation of a prior-art strip-cladding apparatus.

FIG. 1 is a front elevation of an apparatus more completely described in the United States patent application of Barger, Ser. No. 596,878, incorporated herein by reference. A housing 46 includes means for feeding an electrode strip 14 to a work piece 10. A welding current is passed through the electrode strip to the work piece, causing the strip to be deposited on work piece 10. Electromagnets 24 and 26 are pulsed by signals fed to coils 30 and 32, respectively, and molten welding flux, not shown in FIG. 1, is agitated by the magnetic field, thereby agitating the deposited molten metal beneath it. The cladding apparatus and the work piece are moved relative to each other so that metal is deposited in a strip generally perpendicular to the plane of FIG. 1.

In a typical application of the apparatus, FIG. 1 would be a plane through the axis of a cylinder, the cylinder being a vessel to be clad. The welding apparatus would be held stationary or moved slowly along the axis of the cylinder, and the cylinder would be rotated, thereby leaving a circumferential or spiral cladding strip on the interior of the vessel. In a typical vessel, it would not be unusual for an obstruction, such as flange 20, to prevent complete strip cladding of the interior of the vessel. This would be due to the interference of the flange with electromagnet 24, coil 30, and a portion of housing 46 which would prevent the depositing of cladding in the corner formed by the flange. Accordingly, in such situations it is typical to complete the cladding by manual operation using a rod electrode. The welding time for such operation is as high as 30 times as great as the welding time for a comparable area using automatic strip cladding. As a result, it is important to find a method for extending strip cladding all the way up to obstructions such as flange 20.

Figure 2:
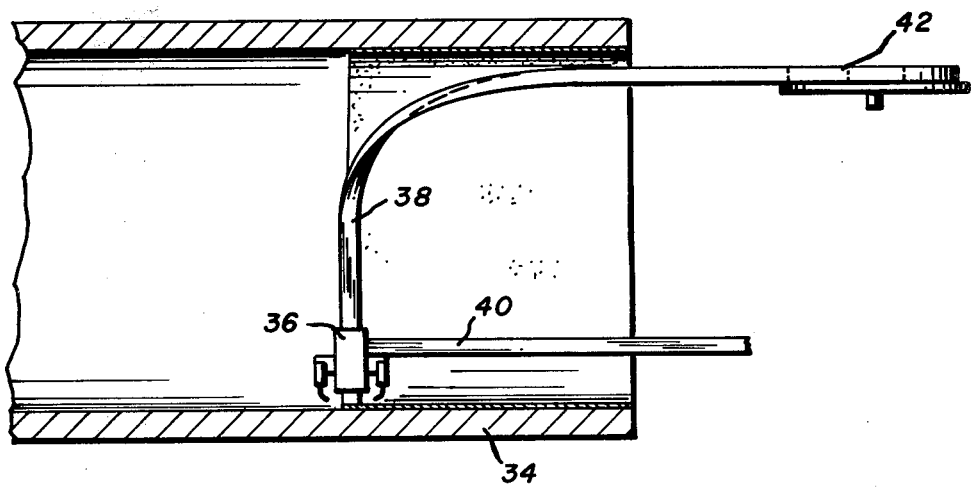
FIG. 2 is an illustration of the prior-art strip-cladding apparatus used in a small cylinder.

Due to the convenience and speed of the automatic strip cladding method, it is also desirable to extend its usability in other areas. FIG. 2 shows an example of a small cylinder being circumferentially clad using the strip cladding method. Due to its size, it is not possible to insert the entire apparatus, including strip-electrode spool 42 and related components not shown in the drawings, such as a strip feed motor and a gear reducer, into the interior of the work piece 34, a cylinder shown at a plane through its axis. Only welding head 36 is positioned inside work piece 34, its location being controlled by positioning arm 40, which is connected to other positioning means not shown. In order to feed electrode strip 38 from spool 42 to welding head 36, it is necessary that the plane of electrode strip 38 be rotated from that in which it lies as it leaves spool 42 to that which it assumes at welding head 36. This rotation results in a spiral in the interior of cylinder 34. It is the combination of the welding-head size and the room required for the spiral of electrode strip 38 that puts a lower limit on the diameter of the cylinder that can be clad by this method. Of course, the room required for the spiral is affected by factors such as the width of the clad strip; the narrower the clad strip, the smaller is the space required for the spiral. On the other hand, a wide cladding strip is desirable because cladding can be accomplished with greater speed if the strip electrode is relatively wide. Accordingly, if the cylinder to be clad has a relatively small diameter, it is necessary to either clad with a very narrow strip or to use a rod electrode to clad its interior.

Figure 3:
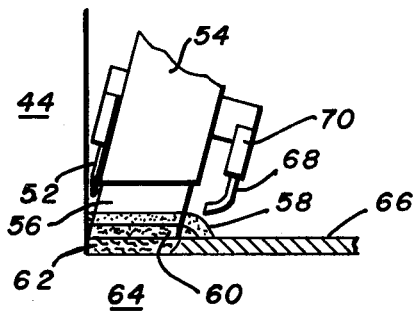
FIG. 3 is a side elevation of the apparatus of the present invention.

FIG. 3 shows an embodiment of the present invention that eliminates some of the problems encountered in the prior art. A work piece 64 is shown with an obstruction, flange 44, that would ordinarily prevent cladding into the corner formed by work piece 64 and its flange 44. The electrode-strip feeding apparatus 54, similar to element 46 of FIG. 1, performs the function of feeding strip electrode 56 to the work piece. As described in U.S. patent application Ser. No. 596,878, previously mentioned, the ordinary application of this apparatus would involve the deposition of a flux material 58 in the weld area that would become molten flux 60 and protect the pool 62 of molten metal. An electromagnet 68 with coil 70 is provided that is similar to electromagnets 24 and 26 and coils 30 and 32 of FIG. 1. The molten pool 62 is formed adjacent a previously laid cladding strip 66 during the cladding operation, and a relatively smooth tie-in between strips 62 and 66 is provided by a pulsating magnetic field.

Unlike the prior art illustrated in FIG. 2, electrode strip 56 is inclined away from obstruction 44 at an angle in the plane of electrode strip 56. This allows the apparatus to fit into the corner, but the incline alone is not sufficient to allow for provision of a magnetic pole piece in the vicinity of the weld, and provision of a magnetic pole is a requirement of the method illustrated in the Barger application previously mentioned. According to the present invention, a means 52 is provided for transmitting magnetic flux into the typically ferromagnetic obstruction 44. It has been found that the transmission of flux into the obstruction in the area shown will result in the performance of obstruction 44 as a magnetic pole complimenting pole piece 68. The pole thus formed is positioned on the side of electrode strip 56 opposite magnetic pole piece 68, and this is the proper position for the operation of the apparatus disclosed in the previously mentioned Barger application.

It is thought that the proper positioning of the pole is accomplished through the following mechanism. Magnetic flux is transmitted into obstruction 44 because the air gap between member 52 and ferromagnetic obstruction 44 is small compared to that between member 52 and pole piece 68. (All of the pieces that make up head 54, unlike pole pieces 52 and 68, are made of nonmagnetic material.) It would appear from this that the magnetic-flux lines would be shorted around welding-flux layer 60 by the carbon steel in flange 44 and work piece 64. However, the heat of welding causes the welding flux to melt, and a flux is used that has a relatively high magnetic permeability in its molten state. Further, the heat of the welding operation raises the temperature of the work piece in the area of the welding to a temperature high enough so that the work piece is no longer ferromagnetic; therefore, the permeability of the work piece is reduced, and the permeability of the flux is increased, to the extent that the path of the majority of the flux passes from member 52 through flange 44 to moltenflux pool 60 and out to pole piece 68. The pulsating magnetic field caused by coils 50 and 70 has a component transverse to the surface of flux pool 60, and the change in magnetic flux agitates the welding flux, which in turn agitates molten-metal pool 62, thereby providing a satisfactory tie-in between adjacent cladding strips. Given this explanation, it is apparent that the positioning of pole piece 68 is somewhat important, since it is desirable that a significant transverse component of the magnetic field exist in the tie-in regions and that pole piece 68 not be brought too close to lower-temperature, high-permeability regions of work piece 64. Thus, preliminary adjustment of the position of pole piece 68 in order to optimize tie-in appearance can be expected.

Figure 4:
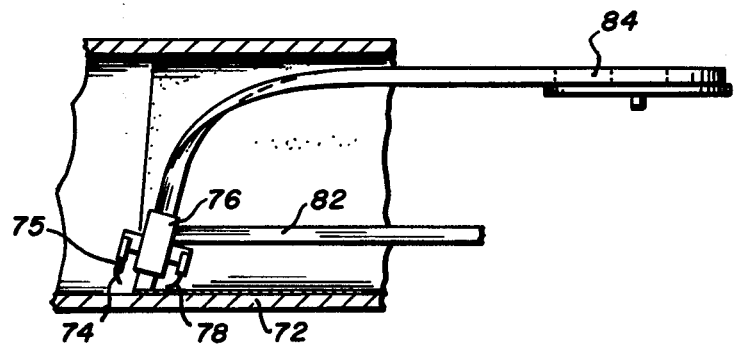
FIG. 4 is an illustration of an embodiment of the present invention used in a small cylinder.

The angled-strip-electrode feature of the present invention can also be employed to advantage in small-diameter cylinders. As was mentioned in the discussion of FIG. 2, the amount of room required for the spiral of the strip electrode places a lower limit upon the size of the cylinder that can be clad with the strip-cladding method. As is illustrated in FIG. 4, the inclination of the electrode strip reduces the radius required for the spiral, thereby reducing the limit on cylinder diameter. FIG. 4 shows a welding head 76, similar to welding head 54 of FIG. 3, positioned inside a cylinder 72 to be clad. A pole piece 78 similar to pole piece 68 of FIG. 3 is used, and an extension 74 of member 75 (corresponding to member 52 of FIG. 3) is attached for situations in which a corner is not used as a pole piece. Positioning arm 82 corresponds to positioning arm 40 of FIG. 2, and spool 84 corresponds to spool 42. As is illustrated, the spiraling of the strip requires less space when the electrode is initially inclined as in FIG. 4. A 15 degree inclination is illustrated in FIGS. 3 and 4, but the amount of inclination is not limited to 15 degrees, and increasingly narrow cylinders can be clad by increasing the inclination to the extent practicable. Accordingly, the present invention, in addition to providing means for cladding into corners, makes it possible to clad cylinders that are smaller than the smallest that could be clad by prior-art devices.

Figure 5:
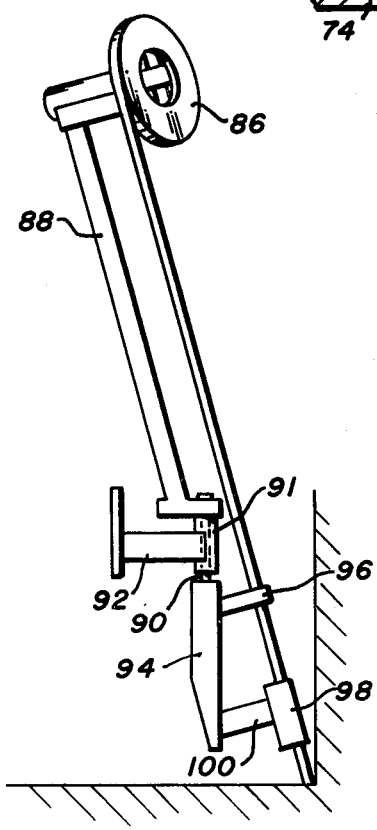
FIG. 5 illustrates a typical means for mounting the apparatus of the present invention.

In actual use, the apparatus of the present invention has been mounted as shown in FIG. 5. Strip-electrode spool 86 is mounted on spool arm 88, which is rigidly connected to shaft 90. Shaft 90 is rotatably mounted in a sleeve 91 connected to positioning arm 92, and it is rigidly connected to mounting plate 94. Guide 96, which is provided to direct the electrode strip 87 into welding head 98, is mounted on mounting plate 94, as is welding-head arm 100.

For use in welding large cylinders, such as pressure vessels, arm 92 is moved by appropriate means into the interior of the pressure vessel. Sufficient clearance exists in large pressure vessels to accommodate spool 86 and the rest of the mounting apparatus. When it is desired to clad into a corner as shown in FIG. 5, the apparatus is mounted as shown, and cladding into the corner will be carried on as previously described. As the apparatus is drawn away from the corner, the extension 74 of FIG. 4 is added, and the general orientation of the apparatus remains as in FIG. 5, with the exception that the vertical member is not used as a pole piece. When the cladding is meant to be applied into a corner oriented in the opposite direction, shaft 90 is rotated, spool arm 88 and mounting plate 94 thereby being rotated about the axis of the shaft, and the spool and welding head are shifted accordingly. In this manner, the means used to position bearing 92 does not have to be reoriented in order to clad into an opposite corner.

What is claimed is:

1. In an apparatus for the submerged-arc cladding of metallic work pieces with metal electrode strips melting in an electric arc while forming weld beads on the work piece, said work piece having a surface to be clad and an obstruction extending in a direction generally transverse to the surface to be clad, said obstruction being of a material having a relatively high magnetic permeability, comprising an electrode strip, means operative to move the electrode strip and work piece relative to each other, means for passing an electric current through the electrode and for creating an electric arc between the work piece and the electrode strip to melt the strip and to deposit a cladding layer on the work piece in a generally linear cladding zone, means for depositing a weldingflux covering in the region of the electric arc and at least the portion of the weld bead where the deposited cladding material is in a molten state, the flux covering being sufficient to provide a layer of molten flux overlaying the region of molten metal, and electromagnetic means having first and second poles of opposite polarity positioned adjacent opposite edges of the electrode strip, the improvement comprising:
   a. said electrode strip being inclined away from the obstruction in the plane of the strip;
   b. said first pole located at the edge of said electrode strip adjacent to the obstruction being positioned such that magnetic flux is transmitted from said first pole into said obstruction, thence from said obstruction thru said layer of molten flux to said second pole;
   c. said layer of molten flux having a relatively high magnetic permeability.

2. In an apparatus for the submerged-arc cladding of metallic work pieces with metal electrode strips melting in an electric arc while forming welding beads on the work piece, said work piece having a surface to be clad and an obstruction extending generally transverse to the surface to be clad, said obstruction being of a material having a relatively high magnetic permeability, comprising an electrode strip, means operative to move the electrode strip and work piece relative to each other, means for passing an electric current through the electrode and for creating an electric arc between the work piece and the electrode strip to melt the strip and to deposit a cladding layer on the work piece in a generally linear cladding zone, whereby flux lines are formed due to the electric current, and means for depositing a welding-flux covering in the region of the electric arc and at least the portion of the weld bead in which the deposited cladding material is in a molten state, the flux covering being sufficient to provide a layer of molten flux covering said region of molten metal, said layered molten flux having a layer of unmelted welding flux thereover, the flat side of said electrode strip facing the region of molten flux and molten metal layers being defined as the trailing edge of the electrode strip, an electromagnetic means having first and second poles of opposite polarity positioned adjacent opposite edges of the electrode strip and on the trailing side thereof adjacent the region of molten flux and molten metal, and the polarity and location of the poles being such that flux lines passing therebetween will tend to counteract on the trailing side the flux lines which surround the electrode strip due to the welding current, the improvement comprising:
   a. said electrode strip being inclined away from the obstruction in the plane of the strip;
   b. said first pole located at the edge of said electrode strip adjacent to the obstruction being positioned such that magnetic flux is transmitted from said first pole into said obstruction, thence from said obstruction thru said layer of molten flux to said second pole;
   c. said layer of molten flux having a relatively high magnetic permeability.

3. In the method of submerged-arc cladding of a metallic work piece having a surface to be clad and an ostruction generally transverse to the surface to be clad, said obstruction being of a material having a relatively high magnetic permeability, which comprises the steps of moving the work piece transversely relative to an electrode strip, passing a current through the electrode strip and striking an arc between the lower edge of the electrode strip and the work piece to melt the electrode strip and deposit a cladding layer on the surface of the work piece to one side of the strip during movement of the work piece, the cladding layer being in a molten state for a distance from the strip, supplying welding flux to the vicinity of the arc during movement, and creating a magnetic field in the region of the cladding material, the improvement wherein:
   a. the step of creating the magnetic field comprises transmitting magnetic flux into the obstruction in such a manner that the magnetic flux will be guided to the region of the molten cladding material;
   b. the step of supplying welding flux to the vicinity of the arc comprises supplying welding flux that has a relatively high magnetic permeability in its molten state; and c. the step of moving the work piece transversely relative to an electrode strip comprises moving the work piece transversely relative to an electrode strip inclined away from the obstruction in the plane of the electrode strip.

4. In the method of submerged-arc cladding of a metallic work piece having a surface to be clad and an obstruction generally transverse to the surface to be clad, said obstruction being of a material having a relatively high magnetic permeability, that comprises the steps of moving the work piece transversely relative to an electrode strip, passing a current through the electrode strip and striking an arc between the lower edge of the electrode strip and the work piece to melt the strip and deposit a cladding layer on the work piece to one side of the strip during movement of the work piece, whereby flux lines surrounding the metal strip are formed, the cladding layer being in a molten state for a distance from the strip, supplying welding flux to the vicinity of the arc during movement, and creating a magnetic field in the region of the molten cladding material, at least one side of the strip having lines of flux extending substantially parallel to the surface of the work piece in the direction of motion opposite to flux lines surrounding the electrode so that the flux lines of the magnetic field counter the effects of the flux lines surrounding the electrode, the improvement wherein:

a. the step of creating a magnetic field comprises transmitting magnetic flux to the obstruction in such a manner as to transmit magnetic flux into the region of the molten cladding material.

b. the step of supplying welding flux to the vicinity of the arc comprises supplying welding flux that has a relatively high magnetic permeability in its molten state; and c. the step of moving the work piece transversely relative to an electrode strip comprises moving the work piece transversely relative to an electrode strip inclined away from the obstruction in the plane of the electrode strip.

* * * * *